Feb. 15, 1949.  D. G. ROOS  2,461,775
VEHICLE SPRING SUSPENDED HALF-AXLE FOR
SUPPORTING STEERABLE WHEELS
Filed Sept. 18, 1944  3 Sheets-Sheet 1
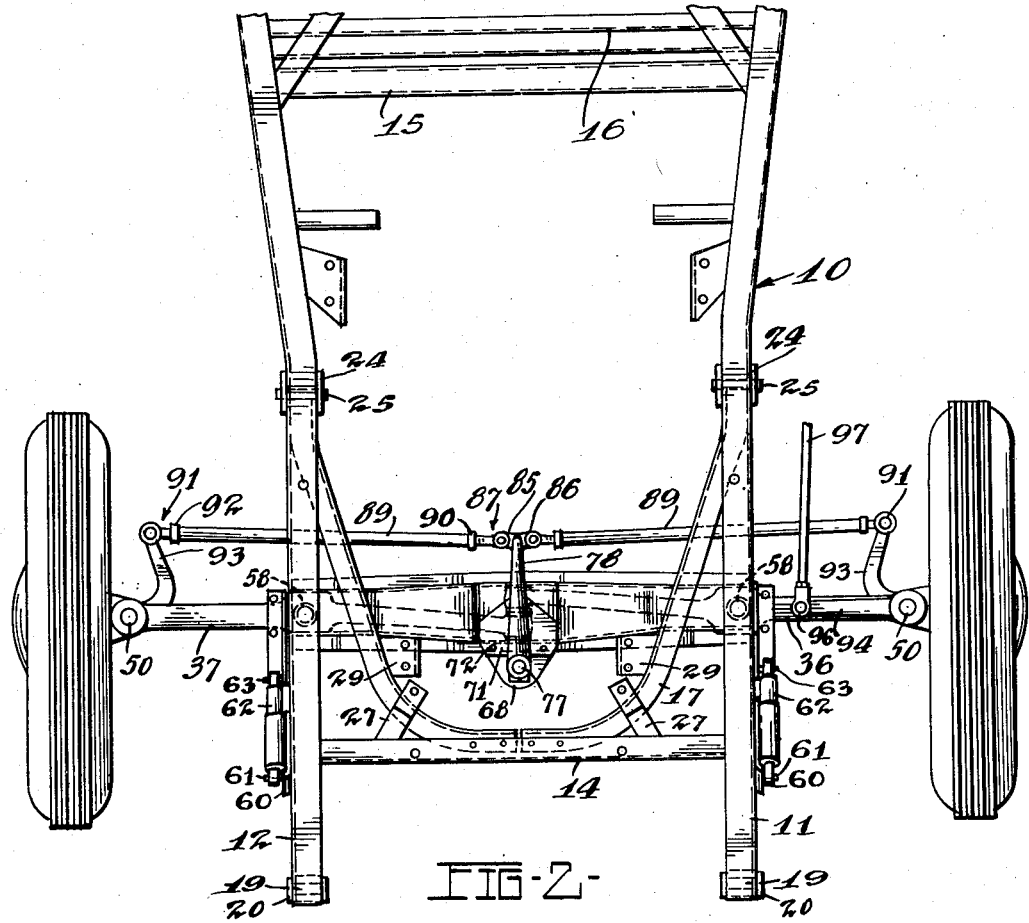
FIG-2-
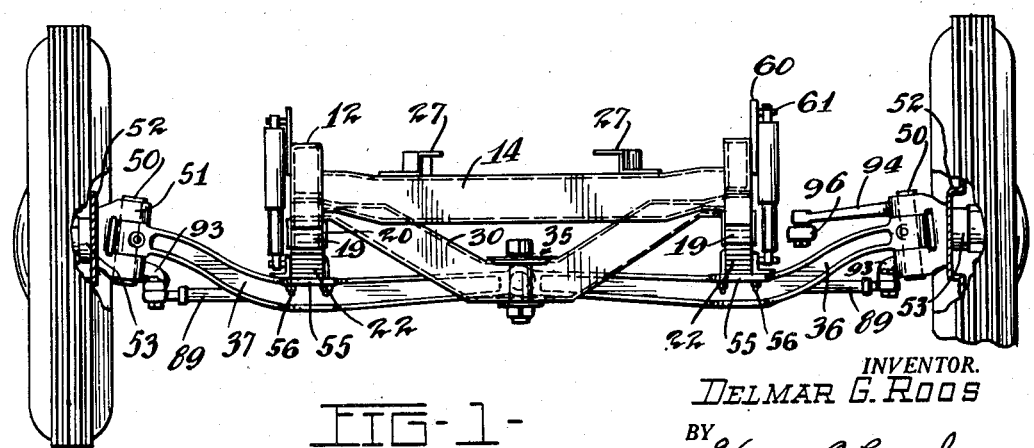
FIG-1-
INVENTOR.
DELMAR G. ROOS
BY Harry O. Ernsberger
ATTORNEY.

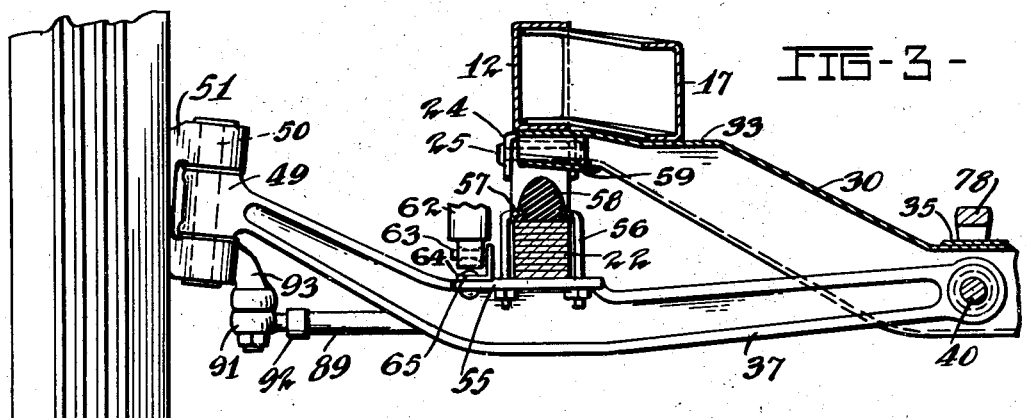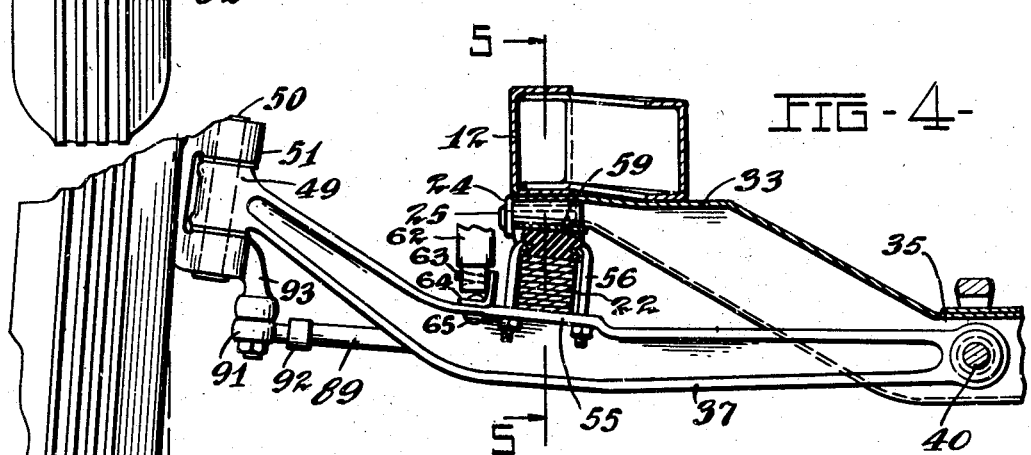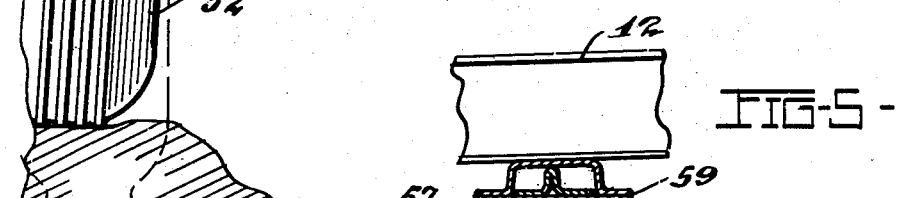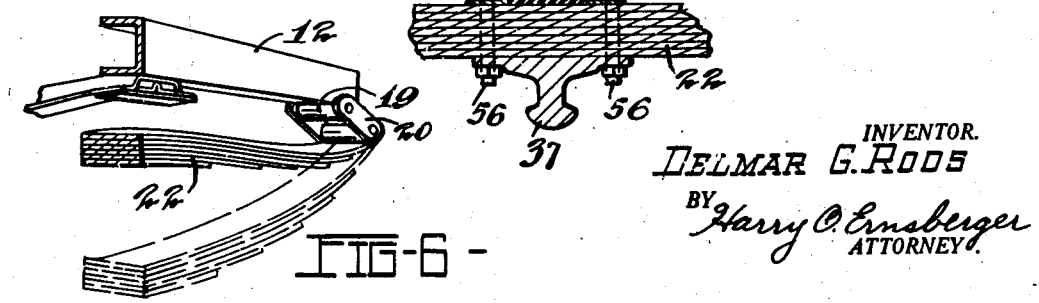
INVENTOR.
DELMAR G. ROOS
BY Harry C. Ernsberger
ATTORNEY.

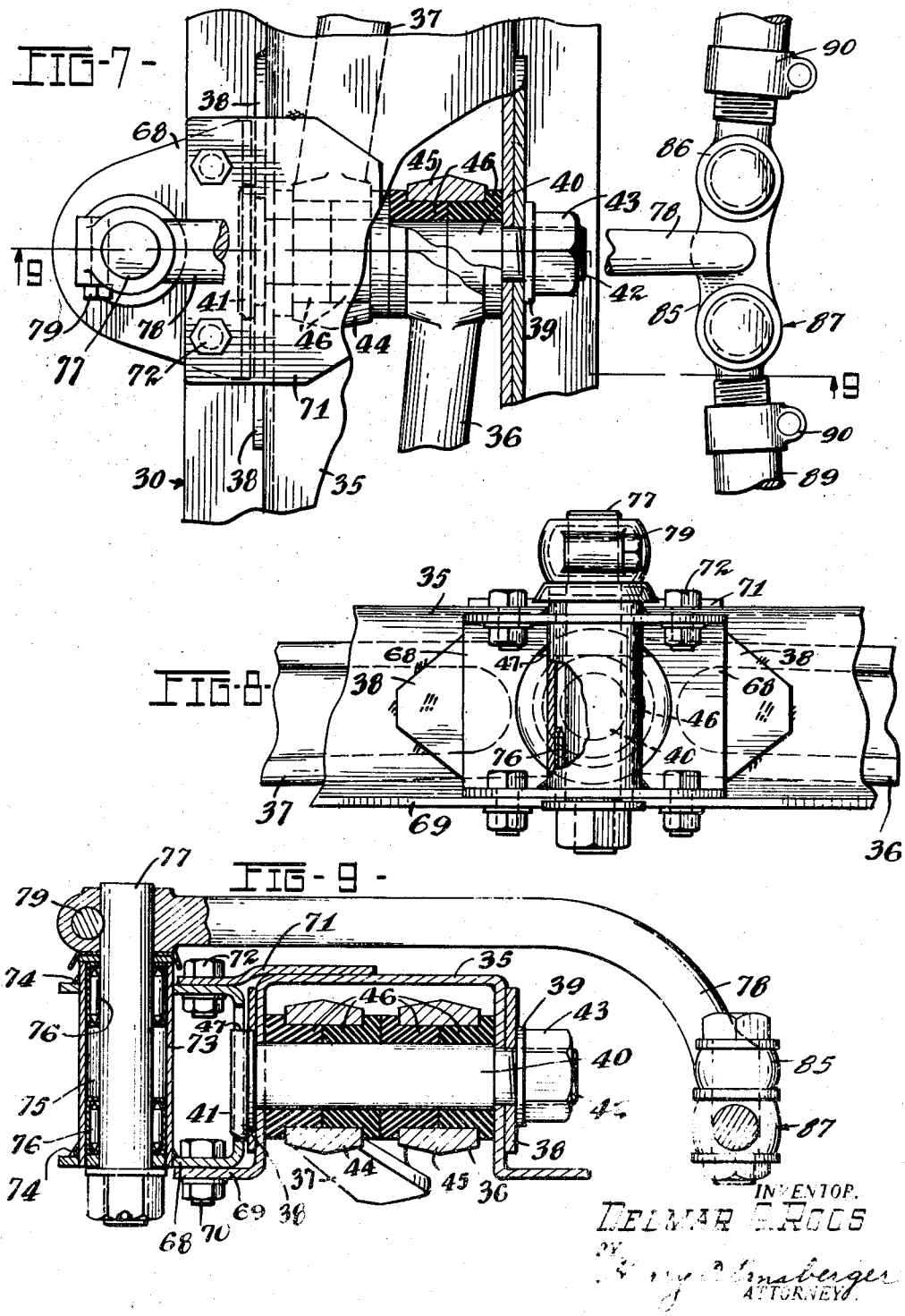

Patented Feb. 15, 1949

2,461,775

UNITED STATES PATENT OFFICE 2,461,775

VEHICLE SPRING SUSPENDED HALF-AXLE FOR SUPPORTING STEERABLE WHEELS

Delmar G. Roos, Toledo, Ohio, assignor to Willys-Overland Motors, Inc., Toledo, Ohio, a corporation of Delaware Application September 18, 1944, Serial No. 554,643

1 Claim. (Cl. 280—96.2)

1

This invention relates to the running gear of automotive vehicles and more particularly to an arrangement in which the dirigible or steerable wheels of the vehicle are suspended from the frame for independent movement with respect to each other.

The invention embraces the provision of an arrangement of independently sprung non-driving wheels for a vehicle which is simple in construction and assembly and one which may be produced in quantities at a reasonable cost.

An object of the invention resides in an arrangement for independently suspending the dirigible wheels of a vehicle whereby oscillation or substantially vertical movement of the wheels takes place about a common axle.

The invention embraces an arrangement of spring suspension in combination with a divided axle system wherein the vehicle springs are subjected to compound stresses during vertical movements of the steerable wheels so that a variable spring rate is attained without the use of additional means or mechanism.

An object of the invention resides in a construction wherein longitudinally arranged plate or leaf springs connect the frame to swinging half-axles in a manner to modify the natural or normal periodicity of vibration of the springs whereby reactions of the spring system in operation are quickly damped out.

Still another object is the provision of an arrangement wherein non-driving wheels of a vehicle are independently sprung or supported by means of half axles so that unsprung weight is reduced to a minimum and an improved ride for the vehicle obtained, the suspension being such as to enhance the roadability of the vehicle especially in negotiating curves at high speeds.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a front elevational view illustrating a vehicle chassis and running gear embodying a form of my invention;

Figure 2 is a top plan view of the arrangement illustrated in Figure 1;

Figure 3 is a front elevational view, certain parts being shown in section, illustrating a half

2 axle and spring suspension arrangement of my invention;

Figure 4 is a view similar to Figure 3 showing the axle in its uppermost position when the wheel encounters an obstruction in the roadway;

Figure 5 is a vertical sectional view taken substantially on the line 5—5 of Figure 4;

Figure 6 is a diagrammatic view showing the distortion of the spring for different positions of the axle;

Figure 7 is an enlarged top plan view showing the axle supporting arrangement, certain portions of the frame being broken away for purposes of illustration;

Figure 8 is a front elevational view of the construction shown in Figure 7; and

Figure 9 is a vertical sectional view taken substantially on the line 9—9 of Figure 7.

Referring to the drawings in detail, the vehicle frame construction 10 is inclusive of spaced longitudinally extending side rails 11 and 12 which are joined together at their forward portions by means of a transversely extending channel shaped member 14. The rearward portions of the frame side rails are joined together by other transverse members 15 and 16. Secured to side rails 10 and 11 and transverse member 14 are reinforcing members 17, each generally L-shaped in contour and of channel shaped cross section. The reinforcing members 17 are riveted and welded to the side rails and transverse member 14.

Welded to the forward extremities of the frame rails 11 and 12 are bushings 19 each adapted to be connected to a spring shackle 20, the latter being connected to an eye formed at the forward extremity of the upper leaf of each spring assembly 22. Disposed beneath each frame rail 11 and 12 and riveted thereto are U-shaped brackets 24, the side walls of the brackets being bored to receive a bolt 25 which passes through an eye formed at the rear extremity of the upper leaf of each of the spring assemblies 22. The frame construction is also inclusive of a pair of brackets 27 which are riveted to the members 14 and 17 and which form supports for the cooling radiator (not shown). The member 17 also carries a pair of brackets 29 which form supports for the forward end of an engine (not shown).

Secured to and connecting the side rails 11 and 12 is a support 30 of U-shaped cross section, the extremities of the support being welded or otherwise secured to the side rails 11 and 12. The support 30 is also configurated with platform-like surfaces 33 which engage and are secured to the lower flange portions of the reinforcing members 17 as shown in Figures 3 and 4. The mid-portion 35 of the support 30 is lower than the frame rails 11 and 12 and is adapted to form a support for the inner ends of the half-axle members 36 and 37. As particularly shown in Figure 9, the opposing side walls of portion 35 of support 30 are provided with reinforcing plates 38 which together with the wall of the support 30 are bored to receive a pivot pin or shaft 40 having a headed portion 41 and a threaded tenon 42 at its opposite end adapted to receive a washer 39 and nut 43 for holding the shaft 40 in position.

The adjacent overlapping end portions of the half-axles 36 and 37 are formed with bosses 44 and 45 which are bored to accommodate bushings 46 disposed in the ends of the half axles and which receive the shaft 40. The bushings 46 are preferably made of rubber or like material for pivotally supporting the inner adjacent ends of the half axles. The bushings 46 provide a certain degree of resilience and shock absorbing characteristics as well as eliminate noise. The half axles 36 and 37 move or oscillate through comparatively small angles and this movement results in slight torsional distortion or torsional stress in the bushings. In assembly, the bushings are slightly compressed so that there is no relative movement taking place between the surfaces of the bushings engaging the shaft 40 or the interior walls of the openings in bosses 44 and 45. By this means the half axles are, in effect, pivotally supported for limited oscillatory movement without relative movement occurring between any metallic bearing surfaces. It should be noted that the head 41 of shaft 40 is flattened as at 47 to fit into a correspondingly shaped opening in the adjacent reinforcing plate 38. By this means the bolt or shaft 40 is prevented from rotating during oscillatory movement of the half axles.

The outer extremities of the half axles 36 and 37 are each formed with a boss portion 49 which is bored to receive king pins 50 upon which are swivelled members 51, the latter being formed with a spindle 53 upon which is journalled a vehicle wheel 52. A swivelling of member 51 around the axis of king pin 50 renders the wheel 52 dirigible for purposes of steering.

Each of the half axles 36 and 37 are formed with integral spring pad portions 55 to which are fixedly secured the central portions of leaf spring assemblies 22 which are secured thereto by means of U-shaped bolts 56 so as to securely clamp the spring assemblies to the half axles. Disposed above each spring assembly is a member 57 carrying a resilient buffer 58 which is adapted to engage a plate 59 secured to each end of the support 30, thus providing a resilient means for limiting the uppermost position of the half axles.

Riveted or otherwise secured to the exterior walls of the frame rails 11 and 12 are upwardly extending brackets 60 each carrying a pin 61 to which is secured one element of a shock absorber construction of the telescoping type the lower element 62 of each shock absorber assembly being connected to a pin 63 carried upon a bracket 64 riveted to each half axle by means of rivets 65. A rubber bushing surrounds the pin 63 so as to accommodate the slight angular movement of the shock absorber.

Means are provided for articulately connecting the wheel carrying members 51 together and to steering mechanism for controlling the direction of movement of the vehicle. Secured to the forward wall at the central portion of the support 30 is a U-shaped member 68 secured to the forwardly extending flange 69 of support 30 by means of bolts 70. Welded to the upper wall of support 30 is a plate 71 having a forwardly extending portion secured to the upper portion of bracket 68 by means of a bolt 72. The upper and lower projecting portions of member 68 are bored to accommodate a vertically disposed bushing 73 which is welded to the bracket as at 74. Disposed within the bushing 73 are sets of needle bearings 76 within which is mounted a pin or shaft 77. The space 75 between bushings 73 and shaft 77 provides a lubricant chamber or reservoir for supplying lubricant to the needle bearings 76. Secured to a portion of the shaft 77 projecting above bushing 73 is an arm 78 secured to the shaft by means of a clamping bolt 79. The free end of arm 78 is formed with transversely extending boss portions 85 and 86 which are bored to receive ball joint assemblies 87 of conventional construction, each assembly being connected to a tubular tie rod 89 by means of a clamp 90. The opposite end of each tie rod 89 is secured to a similar ball joint assembly 91 by means of a clamp 92, ball joint assemblies 91 being carried by arms 93 which are integrally formed as part of the wheel supporting members 51.

One of the wheel carrying members 51 is integrally formed with a projecting arm 94, the extremity of the arm carrying a ball which engages in a fitting 96 forming a ball joint. The fitting 96 is connected to the steering mechanism (not shown) by means of a drag link 97 in a conventional manner.

The arrangement of my invention hereinbefore described provides a simple yet effective means for permitting independent movement of one non-drive wheel with respect to the other non-drive wheel. Furthermore, the pivotal connection of the half-axles to the chassis frame is accomplished through the medium of the bushings 46 formed of yieldable material so that no wear of the metallic parts is encountered by reason of the pivotal movement of the half-axles. It should be noted that when the vehicle wheel encounters a road obstruction as illustrated in Figure 4, the pivotal movement of the half-axle about the axis of shaft 40 sets up compound stresses in the leaf spring assembly. With conventional type of solid axle construction the leaf springs flex in substantially vertical planes. Such spring arrangement with fixed points of connection to a frame when subjected to deflection in one plane has a natural period of vibration. Thus when a spring is flexed under shock, the succeeding vibrations continue with decreasing amplitude until the spring comes to "rest." In the arrangement of the present invention the spring assembly, during movements of the half axle, is simultaneously subjected to vertical flexure and longitudinal twist or torsion. This is exemplified in Figures 4 and 6 illustrating the longitudinal twist as well as the flexure of the spring in a vertical plane. The leaf spring assembly, when arranged for operation in accordance with the present invention, has no natural period of vibration or uniform spring rate, but by reason of the compound stresses, the spring has, in effect a variable rate. This compound spring action involving vertical deflection and torsional stresses, performs the function of quickly damping out the rebound actions of the spring, thus eliminating to a great extent successive spring oscillations and thereby securing an improved "ride" for the vehicle. Another advantage and feature of the invention is that the tread width of the tires engaging the roadway will be variable as the tires have a lateral movement by reason of the vertical swinging movements of the half-axles about an axis disposed in a central plane of the vehicle. This action prolongs the life of the tire as the wear is more uniformly distributed over the tire surface instead of the major amount of wear occurring centrally of the tread. In practical application of my invention I have found that very little lateral "scuffing" of the tires contacting the roadway is encountered as the tires are in rolling engagement with the roadway when the vehicle is moving and during relative vertical movement of the wheels and tires caused by road irregularities.

It is apparent that, within the scope of the invention, modifications and different arrangements may be made other than is herein disclosed, and the present disclosure is illustrative merely, the invention comprehending all variations thereof.

What I claim is:

In an automotive vehicle a frame; an axle supporting member forming a part of the frame; a pair of half-axles having their inner ends in overlapping relationship; said overlapping portions being formed with aligned openings; bushings disposed in said openings; a pivot shaft carried by said support and extending through said bushings forming a pivotal axis for said half-axles; a leaf spring assembly arranged adjacent each side of said frame; means for securing the leaf spring assemblies to said half-axles; a wheel supporting spindle pivotally mounted upon the outer end of each half-axle; a road wheel rotatably supported upon each spindle; an arm journaled on said frame adjacent the pivot shaft, and tie rods connecting each wheel supporting spindle to said arm.

DELMAR G. ROOS.

REFERENCES CITED

The following references are of record in the file of this patent:

UNITED STATES PATENTS

| Number | Name | Date |
| --- | --- | --- |
| 1,979,522 | Baker | Nov. 6, 1934 |
| 2,030,710 | Opolo | Feb. 11, 1936 |
| 2,047,286 | Opolo | July 14, 1936 |
| 2,152,660 | Paton | Apr. 4, 1939 |
| 2,153,271 | Paton | Apr. 4, 1939 |
| 2,339,533 | Wahlberg et al. | Jan. 18, 1944 |
| 2,417,325 | Roos | Mar. 11, 1947 |

FOREIGN PATENTS

| Number | Country | Date |
| --- | --- | --- |
| 400,536 | Great Britain | Oct. 26, 1933 |
| 429,627 | Great Britain | June 4, 1935 |
| 788,264 | France | July 22, 1935 |